United States Patent [19]

Haydock

[11] Patent Number: 4,838,745
[45] Date of Patent: Jun. 13, 1989

[54] TRUNK ORGANIZER

[76] Inventor: Joseph P. Haydock, 508 Arnold Ave., Streamwood, Ill. 60107-3014

[21] Appl. No.: 125,937

[22] Filed: Nov. 27, 1987

[51] Int. Cl.[4] .............................................. B63B 25/24
[52] U.S. Cl. ................................................... 410/121
[58] Field of Search ............................ 296/37.1, 37.16; 248/205.2; 410/117, 120, 121, 156; 224/42.42, 901; 211/182

[56] References Cited

U.S. PATENT DOCUMENTS

| | | |
|---|---|---|
| 2,697,631 | 12/1954 | Miller . |
| 2,986,315 | 5/1961 | Zimmerman . |
| 3,104,085 | 9/1963 | Skladany ............................ 410/121 |
| 3,112,143 | 11/1963 | Zacharias et al. . |
| 3,341,314 | 7/1982 | Feuerstein . |
| 3,513,969 | 5/1970 | Roff . |
| 3,860,284 | 1/1975 | Lichtig .................................. 296/75 |
| 3,974,918 | 8/1976 | Yaremchuk . |
| 4,267,662 | 5/1981 | Gordy .................................. 446/121 |
| 4,488,653 | 12/1984 | Belokin . |

Primary Examiner—Robert B. Reeves
Assistant Examiner—Frank H. Williams, Jr.
Attorney, Agent, or Firm—Hill, Van Santen, Steadman & Simpson

[57] ABSTRACT

A space divider for partitioning a surface and for restraining items located thereon against movement including a block of foam rubber covered by a rubber coating and the hook portion of a hook and loop fastener for securing the space divider to a fibrous mat located on a floor of an automobile trunk. The space divider may be of any shape and the loop portion of a hoop and loop fastener may be affixed to the top of the space divider to provide the ability to stack a plurality of dividers like building blocks around an item to be secured against movement within the trunk.

2 Claims, 1 Drawing Sheet

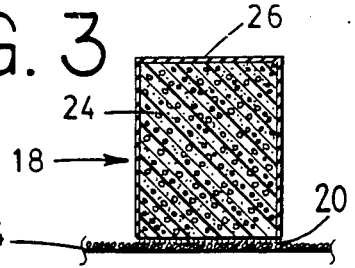
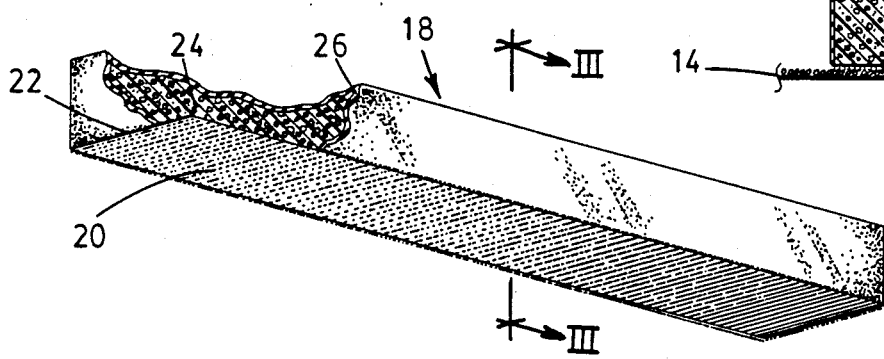
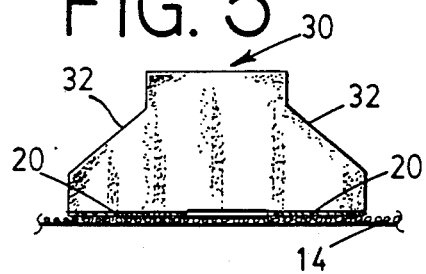 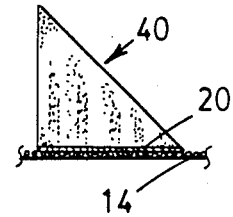 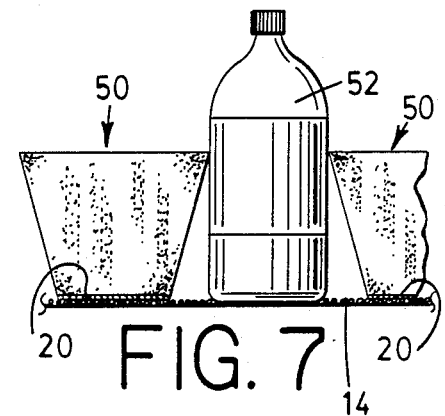
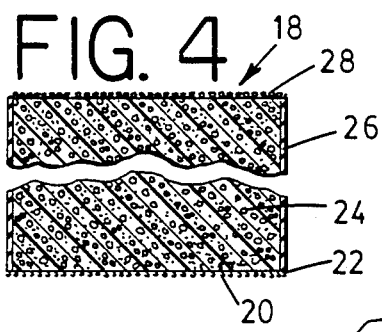
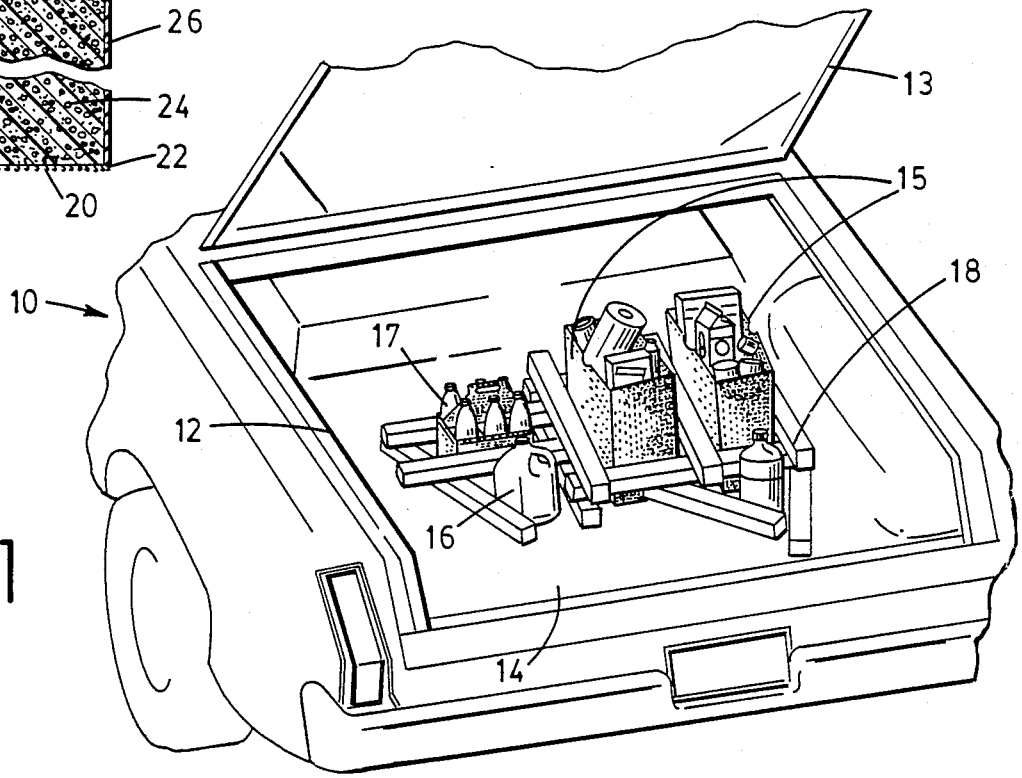

TRUNK ORGANIZER

BACKGROUND

1. Field of the Invention

The present invention pertains generally to space dividers for organizing and restraining items located on a surface and, more particularly, to space dividers used to organize and restrain objects within an automobile trunk or the like.

2. Related Art

Devices for separating spaces are known. Such devices have previously been employed in connection with motor vehicles including trucks, station wagons and automobiles.

U.S. Pat. No. 2,697,631 to Miller discloses a vehicle partitioning and load securing device for use within a truck bed which is used to section off a portion of the truck bed. The device is comprised of a channel portion which is hung from a side wall of the trunk and which accepts wooden holding boards.

U.S. Pat. No. 2,986,315 to Zimmerman discloses a rack for use in a station wagon which prevents articles from moving about within the station wagon.

U.S. Pat. No. 3,513,969 to Roff discloses a bumper jack container assembly for use within a trunk of an automobile wherein a bumper jack and its associated components are securely stored within a rectangular container. The rectangular container is affixed within the trunk by a plurality of hook and loop fasteners which have one component of a hook and loop fastener affixed to the container and the other component affixed to the trunk floor.

However, all of these devices are deficient in that they do not provide for sufficient flexibility in securing items within a vehicle. The dividers cannot be placed at any angle to thereby secure an item in any position Moreover, the divider are heavy and are not easily removed for storage Additionally, the dividers may not be repositioned without requiring reaffixing or resecuring of a component to the floor surface.

SUMMARY OF THE INVENTION

The present invention provides a device which may be used to subdivide a container or surface. The device is in the form of a divider which may be positioned at any angle or position and is easily repositioned without requiring repositioning of a second component to which the divider must be secured. Additionally, the dividers are lightweight and are easily stored when not used.

In one embodiment, the instant divider includes a body portion made of foam rubber cut to an elongated shape and coated with a durable rubber covering. The hook component of a hook and loop fastener is attached to the bottom of the divider. This type of divider is usable in automobile trunks where a fiber mat or carpet is present so that the hook portion of the hook and loop fastener on the bottom of the divider will adhere to the fiber mat, the fibers functioning as the loop portion of a hook and loop fastener.

The function preferred of the divider is to prevent articles within the trunk from moving around due to the motion of the automobile. The exterior rubber covering helps prevent slippage of the item which is to be held in place in the trunk in addition to providing durability to the trunk divider itself.

In other embodiments the dividers may be constructed of other materials. The body portion may be made of any material which is strong enough to restrain an item against a minimal amount of movement. The body portion need not be covered at all or it may be covered with a coating other than durable rubber. For example, the coating may be made of fabrics such as nylon, cotton, wool, et cetera The hook component of the divider may be affixed in any of a number of manners. For example, the hook component may be glued directly to the body portion or directly to the coating The hook component may also be sewn to the body portion or stapled thereto Therefore, an object of the invention is to provide a divider which takes advantage o the fibrous composition of the fiber mats in automobile trunks or elsewhere by directly adhering thereto and which restrains an item within a trunk against movement. An aspect of the invention is the use of the hook portion of a hook and loop fastener to secure the divider to the fibrous surface of a fiber mat or carpet by hooking into the fibrous loops of the mat or carpet.

These and other objects and aspects will become more apparent by reference to the description of the preferred embodiment and to the attached drawings.

BRIEF DESCRIPTION OF THE DRAWINGS

FIG. 1 is a perspective view of an automobile trunk showing dividers embodying the principles of the instant invention in use to secure items within the trunk.

FIG. 2 is a perspective view partially broken away of a divider shown in FIG. 1.

FIG. 3 is a cross-sectional view of the divider of FIG. 2 taken along the line III—III.

FIG. 4 is a cross-sectional elevational end view of another divider embodying the principles of the invention.

FIG. 5 is an elevational end view of another divider embodying principles of the invention showing a different cross-sectional shape for a divider.

FIG. 6 is an elevational end view of another divider embodying principles of the invention showing a different cross-sectional shape for a divider.

FIG. 7 is an elevational end view of another divider embodying principles of the invention showing a different cross-sectional shape for a divider.

DESCRIPTION OF THE PREFERRED EMBODIMENTS

In FIG. 1 there is shown an automobile 10 including a trunk 12 with its lid 13 in the open position. The trunk 12 includes a mat or carpet 14 made of a fibrous material. The fibers of the mat 14 comprise a plurality of loops, curls, interwoven strands and otherwise nappy segments and as such make the mat surface function similar to the loop component of a hook and loop fastener. The trunk 12 contains a variety of items such as filled grocery bags 15, milk container 16 and six-pack 17 which, due to inertia, will tend to move across the surface of mat 14 in response to movement of the automobile.

With reference to FIGS. 1, 2 and 3, a plurality of dividers 18 may be placed within trunk 12 to separate items 15, 16 and 17 and to prevent them from moving in response to movement of the automobile 10. The divider 18 includes a hook component 20 of a hook and loop fastener affixed along its bottom side 22. This hook component 20 is placed upon the mat 14 and engages the fibrous loops therein to secure the divider 18 to the mat 14. The divider 18 also includes a body portion 24 which gives the divider its shape. A covering 26 covers the body 24.

In the preferred embodiment, the body portion 24 is made of flexible foam rubber while the covering 26 is made of a durable rubber coating. However, the body portion 24 may be made of any material which will provide a shape to a divider 18 and which will sufficiently restrain an item against movement as is required under the circumstances such as wood, plastic, et cetera. Similarly, the covering 26 may also be made of any suitable material such as nylon, cotton, wool, et cetera. The rubber coating is preferred because it makes the divider 18 durable and prevents the slippage of the item to be restrained. Other coverings may serve other purposes. Whatever coating is used should be sufficiently thick o provide strength and durability. Of course, the divider 18 may be constructed without the covering 26 at all or the covering may cover less than all sides.

The hook component 20 may be affixed to the body portion 24 in any manner as stated earlier. For example, the component 20 may be glued, stapled or sewn directly to the body portion 24. Additionally, the component 20 may be affixed to the coating 26 in the same manners or by heat sealing whereby the component 20 is placed against the rubber coating 26 while such coating is still hot and tacky so that upon cooling the component 20 and coating 26 are joined.

The hook component 20 engages the fiber mat 14 or other surfaces which may function like a loop component of a hook and loop fastener simply by placing a divider hook component 20 side down and exerting slight pressure to engage the loop like surface with the hook components. The hook component will resist shear forces and thus not detach under the imposition of lateral forces. Thus, items pushing laterally against a divider will not cause it to detach and, in return, it will restrain the items from movement. However, to remove the divider, it need only be picked up by peeling it off of the surface as the hook components will not easily resist such forces.

As can be seen in FIGS. 5, 6 and 7, a divider embodying the principles of the invention may take almost any shape. In FIG. 5, there is shown an end of a divider 30 which includes inclined sides 32. The inclined sides 32 are designed to take advantage of mechanical forces exerted thereon by an item as it leans or pushes against the divider 30. As an item pushes against a side 32, the divider 30 will be pushed down on a mat 14, not shown, further engaging hooks of hook component 20 with fiber loops of mat 14. Thus, the divider 30 will be further secured to the mat 14 and will further restrain an item against movement.

In FIG. 5, it is also shown that two or more hook components 20 may be affixed to a divider. The shapes of such hook components, although not illustrated, may also be of any suitable shape.

In FIG. 6, there is shown a triangular-shaped divider 40. Like divider 30, divider 40 is designed to match shapes of various items and to take advantage of mechanical forces exerted by such items upon divider 40.

In FIG. 7, there is shown a pair of dividers 50 which are also shaped according to the needs of a user of the dividers. The dividers 50 are shown restraining a bottle 52.

Moreover, as can be seen in FIG. 4, a loop component 60 of a hook and loop fastener may be affixed to the top of a divider, for example, divider 18, so that another divider placed thereon will be secured thereto. In this manner, dividers may be stacked one upon the other, as is shown in FIG. 1, like building blocks to provide divider walls of various heights upon a surface to accommodate items of various heights. Also in this manner, the dividers are interlocked for more secure engagement.

Dividers such as divider 18 are very useful for restraining an item such as a briefcase upon an automobile trunk 12 mat or carpet 14 and separate it from other items which may scratch or mar the surfaces of the briefcase. The briefcase is simply surrounded by several dividers which are secured to the mat 14. Moreover, if the proper coating is used, the divider will not scratch, scour or otherwise mar the surface of the briefcase; nor will it damage the automobile. When not used, the dividers may be located to one side of the trunk 12.

Another possible use for such dividers includes restraining a tissue box on the carpeting covering a hump running along down the middle of a car as well as behind the backseat on a back windowsill. Magazines may also be similarly restrained or secured. In fact, such a divider may be used anywhere there is a fibrous surface, including a seat.

Dividers such as those described above are easily repositioned. A previously positioned divider is repositioned simply by peeling it off of a mat 14 and placing it at another location upon the surface of the mat. It is important that such a divider may be positioned at any angle or position upon the surface as the loop like fastener component encompasses the entire mat surface as opposed to selected locations.

Furthermore, dividers such as those described are ideal for placing promotional lettering, signs, logos, et cetera thereon. The dividers include flat sides upon which such promotional lettering, signs, logos et cetera may be located and seen. Automobile venders will find them to be ideal promotional items to give to purchasers because they are inexpensive to manufacturer and yet may contain the dealer's logos, trademarks et cetera which serve to promote the dealership. Of course, others may find such promotional possibilities helpful for their business as well.

While the preferred embodiment of the invention has been disclosed, modifications will be apparent to those skilled in the art but which remain within the scope and spirit of the invention. It is the intent to cover those modifications in the attached claims.

I claim:

1. A space divider for use in an automobile to restrain movement of an article on a fibrous surface in the automobile, comprising:
   an elongated body of flexible foam rubber;
   a rubber coating covering said body;
   a plurality of hooks of a hook and loop fastener affixed to an underside surface of said body and selectively fastenable to the fibrous surface in the automobile to restrict movement of said elongated body and thereby restrain movement of the article;
   a plurality of said elongated bodies;
   each of said plurality of elongated bodies having hooks of a hook and loop fastener on a lower surface, at least some of said elongated bodies having loop portions secured on surfaces of said elongated bodies distinct from said lower surface.

2. A space divider for restraining lateral movements of an object in an automobile, comprising:

a body of a material having at least a lower surface and a side surface, said body being positionable in the automobile with said lower surface on a surface in the automobile and with said side surface abutting the object to restrain the object against movement;

hook means for securing said body to the surface in the automobile including a plurality of hooks attached to said lower surface of said body, said plurality of hooks being engageable with loop means on the surface in the automobile to inhibit movement of said body and thereby restraining lateral movement of said object, said hook means being a hook component of a hook and loop fastener;

a plurality of further bodies positionable in the automobile to restrain the object against movement in further directions; and a least one of hook portions and loop portion of hook and loop fasteners secured to each of said further bodies to enable said further bodies to be selectively fastened to at least one of the surface of the automobile and others of said further bodies to restrain movement of the object in a plurality of direction, said hook and loop portions being secured on plural distinct surfaces of said further bodies.

* * * * *